(12) United States Patent
Palladino et al.

(10) Patent No.: US 10,173,819 B2
(45) Date of Patent: Jan. 8, 2019

(54) OPENING SYSTEM FOR A CONTAINER, A METHOD OF MAKING THE SAME AND A CONTAINER COMPRISING THE OPENING SYSTEM

(71) Applicant: Tetra Laval Holdings & Finance S.A., Pully (CH)

(72) Inventors: Daniele Palladino, Scandiano (IT); Pietro Martini, Parma (IT); Giulio Bertani, Carpi (IT); Niels Damkjaer, Kävlinge (SE); Davide Corradi, Soliera (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/624,199

(22) Filed: Jun. 15, 2017

(65) Prior Publication Data

US 2017/0361977 A1 Dec. 21, 2017

(30) Foreign Application Priority Data

Jun. 17, 2016 (EP) .................................. 16175019

(51) Int. Cl.
*B65D 65/40* (2006.01)
*B29C 45/00* (2006.01)
(Continued)

(52) U.S. Cl.
CPC .......... *B65D 65/40* (2013.01); *B29C 45/0053* (2013.01); *B29C 45/14336* (2013.01);
(Continued)

(58) Field of Classification Search
CPC .... B65D 65/40; B65D 17/4011; B65D 5/708; B29C 45/0053; B29C 45/14336;
(Continued)

(56) References Cited

U.S. PATENT DOCUMENTS

| 5,029,752 A | 7/1991 | Andersson |
| 6,431,434 B1 * | 8/2002 | Haughton ............. B65B 61/205 220/708 |
| 9,242,779 B1 * | 1/2016 | Schildcrout ............... B65B 7/16 |

FOREIGN PATENT DOCUMENTS

| JP | H9-512768 | 12/1997 |
| WO | WO 2015/101427 A1 | 7/2015 |

(Continued)

OTHER PUBLICATIONS

Japanese Office Action in corresponding Japanese Application No. 2017-118370 dated Sep. 25, 2017 (8 pages, including English translation).

(Continued)

*Primary Examiner* — Kareen Thomas
(74) *Attorney, Agent, or Firm* — Finnegan, Henderson, Farabow, Garrett & Dunner LLP

(57) ABSTRACT

An opening system for a container comprising a packaging material having an outside and an inside. An injection molded opening element, wherein the injection molded opening element is attached to the inside of the packaging material at a first point, and extends from the inside of the packaging material and through to the outside of the packaging material. And, wherein the injection molded opening element is attached to the outside of the packaging material at a second point and extends a distance from the second point for opening the container.

19 Claims, 3 Drawing Sheets

(51) Int. Cl.
  *B29C 45/14*   (2006.01)
  *B65D 5/70*   (2006.01)
  *B65D 17/28*   (2006.01)
  *B29L 31/00*   (2006.01)
  *B29K 711/12*   (2006.01)

(52) U.S. Cl.
  CPC .......... *B65D 5/708* (2013.01); *B65D 17/4011*
    (2018.01); *B29C 45/14344* (2013.01); *B29C*
    *2045/14327* (2013.01); *B29K 2711/12*
    (2013.01); *B29L 2031/712* (2013.01)

(58) Field of Classification Search
  CPC .... B29C 2045/14327; B29C 45/14344; B29K
    2711/12; B29L 2031/712
  USPC ...................................... 220/260–270, 359.2
  See application file for complete search history.

(56) References Cited

FOREIGN PATENT DOCUMENTS

| WO | WO 2015/101540 A1 | 7/2015 |
| WO | WO 2015/169656 A1 | 11/2015 |
| WO | WO 2016/037818 A1 | 3/2016 |

OTHER PUBLICATIONS

European Search Report in corresponding EP Application No. EP 161750195.5 dated Dec. 5, 2016 (5 pages).

Office Action issued in European Application No. EP 16175019.5 dated Oct. 25, 2018 (4 pages).

\* cited by examiner ic # OPENING SYSTEM FOR A CONTAINER, A METHOD OF MAKING THE SAME AND A CONTAINER COMPRISING THE OPENING SYSTEM This is a Non-Provisional Application claiming the benefit of European Application No. 16175019.5 filed Jun. 17, 2016, which is incorporated herein by reference.

TECHNICAL FIELD

The present invention generally relates to the field of opening systems. More particularly, the present invention relates to an opening system for containers having food products therein.

BACKGROUND

Today there are several opening systems used for a variety of containers depending on the container and how it is made e.g. plastic, glass, packaging material and so. Based on the material used for the container different opening system having different configurations is then used. Normal issues with opening systems or devices are that they need to be fixed to the container to prevent leakage but at the same time be easy to open, but not by accident. This has been solved in different ways by e.g. the caps with internal breaking of a membrane or the like to prevent leakage and prevent accidental opening. However, known solutions of today are leakage tight but most of the time requires a great force to open. This is a problem for some people with for instance an injury to any motor skills which makes it hard for them to open containers or elderly people having a lowered muscular capability. Also, small packages need to have small opening devices and these could be an issue for children e.g. swallowing them.

Thus, there is a need for an improved opening system which seals but also is easy to open.

SUMMARY

It is, therefore, an object of the present invention to overcome or alleviate the above described problems.

According to a first aspect, an opening system for a container comprising a packaging material having an outside and an inside, an injection molded opening element, wherein the injection molded opening element is attached to the inside of the packaging material at a first point, and extends from the inside of the packaging material and through to the outside of the packaging material. And, wherein the injection molded opening element is attached to the outside of the packaging material at a second point and extends a distance from the second point for opening the container.

According to a second aspect, a method of producing an opening system for a container comprises providing a packaging material having an inside and an outside. The method further comprises molding an injection molded opening element being arranged on the inside of the packaging material and on the outside, and extending through packaging material. And, attaching the molded opening element to the inside at a first point, and attaching the molded opening element to the outside at a second point.

Further examples of the disclosure are defined in the dependent claims, wherein features for the fourth and subsequent aspects of the disclosure are as for the first to third aspects mutatis mutandis.

Some examples of the disclosure provide for a more robust opening system against any faulty opening.

Some examples of the disclosure provide for any force acting on an opening element will be transferred into a packaging material.

Some examples of the disclosure provide for an area of an opening element which is attached to a second point is chosen according to an opening force wanted and/or needed to open an opening system.

Some examples of the disclosure provide for a distribution on an outside of a packaging material and attached to it, determining the force needed to tear open an opening system.

Some examples of the disclosure provide for an opening force along a same line.

Some examples of the disclosure provide for a straight line coinciding with a weakest point(s) of a material.

Some examples of the disclosure provide for a first and second point being arranged at e.g. 45, 90, 135 or 180 degree difference.

Some examples of the disclosure provide for an opening system to create forces in a desired direction.

Some examples of the disclosure provide for a direction not coinciding with the weakest point(s) of a material.

Some examples of the disclosure provide for a selection of an angle such that a desired opening force is achieved based on the combination of the angle and a structure of the selected packaging material.

Some examples of the disclosure provide for a single opening system on different materials.

Some examples of the disclosure provide for achieving a same opening force by simply angling the opening system.

Some examples of the disclosure provide for hydrostatic pressure injection molding.

Some examples of the disclosure provide for an opening system being recyclable.

Some examples of the disclosure provide for a mechanically weaker packaging material than that of the opening system.

Some examples of the disclosure provide for an opening element being capable of tearing, shearing, breaking or otherwise open a packaging material.

Some examples of the disclosure provide for a delta in mechanical strength between a packing material and a material used for an opening system.

Some examples of the disclosure provide for a laminate as being a seal for any product inside a container.

Some examples of the disclosure provide for an easier opening of the opening system.

Some examples of the disclosure provide for a simpler injection molding process.

Some examples of the disclosure provide for less potential issues such as any packaging material being mixed into an opening element.

Some examples of the disclosure provide for an even more affixed opening element to a packaging material.

Some examples of the disclosure provide for an opening element can even better withstand any forces.

Some examples of the disclosure provide for an opening element comprising a protrusion.

Some examples of the disclosure provide for an opening element more easily penetrating through a packaging material.

Some examples of the disclosure provide for an opening element configured to give a cleaner cut or tear.

Some examples of the disclosure provide for a force from an opening element will be initially localized to a protrusion at the opening element.

Some examples of the disclosure provide for initial penetration all along a circumference of an opening element.

Some examples of the disclosure provide for an opening support acting as a counter force to an opening element.

Some examples of the disclosure provide for an opening support aiding in any tearing of a packaging material.

Some examples of the disclosure provide for a cleaner visual appearance of an opening.

Some examples of the disclosure provide for an improved connection between an opening element and an opening support.

Some examples of the disclosure provide for further strengthening an opening system and its robustness.

Some examples of the disclosure provide for a breakable connection which is also a tamper evidence.

Some examples of the disclosure provide for a tamper evidence.

Some examples of the disclosure provide for an opening element being secured form being accidentally or otherwise opened.

Some examples of the disclosure provide for an opening element being easier to grip and maintain a grip for opening an opening system.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

Figure 1:
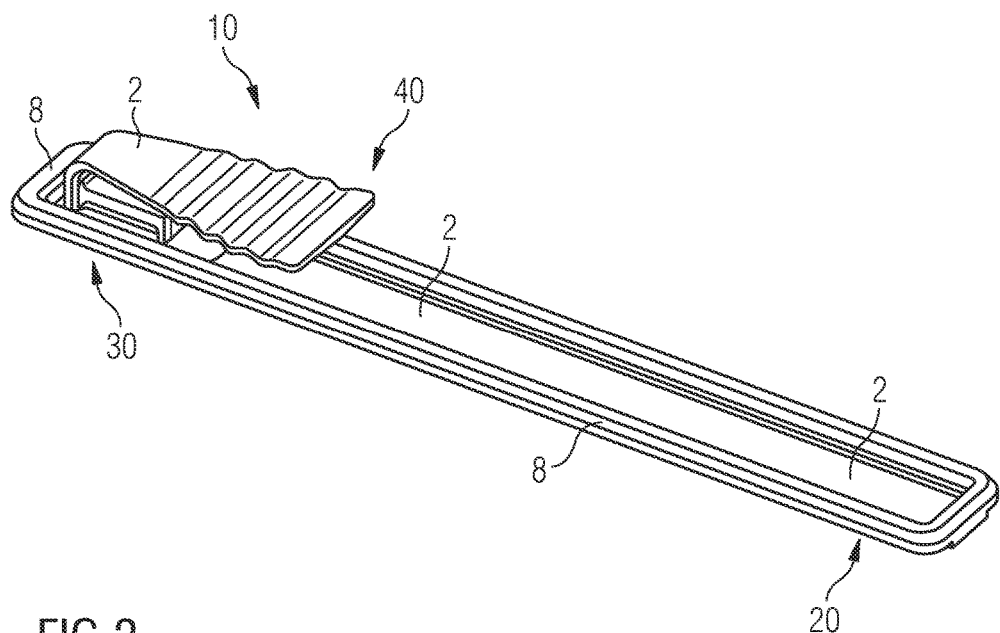
FIG. 1 is a side view of an opening system for a container comprising a support structure without packaging material.

FIG. 1 illustrates an example of an opening system 10 for a container comprising a packaging material 1 having an outside and an inside. The opening system 10 further comprises an injection molded opening element 2, wherein the injection molded opening element 2 is attached to the inside of the packaging material 1 at a first point 20, and extends from the inside of the packaging material 1 and through to the outside of the packaging material 1. And, wherein the injection molded opening element 2 is attached to the outside of the packaging material 1 at a second point 30 and extends a distance from the second point 30 for opening the container. By having the injection molded opening element 2 attached to the inside and then extending out through the packaging material 1 and also being attached to the outside of the packaging material 1, the packaging material 1 will bear the major part of any force affecting the opening element 2. This makes the opening system 1 more robust against any faulty opening since any force acting on the opening element 2 will be transferred into the packaging material 1 instead of the opening element 2.

In an example, the second point 30 has an area which is chosen according to an opening force wanted and/or needed to open the opening system 10. In an example, the area is circular, square, rectangular and/or has an irregular shape. The area of the second point 30 can really have any shape since it is the amount of injected material at the second point 30 and how it is distributed on the outside of the packaging material 1 and attached to it that determines the force needed to tear open the opening system 10.

Figure 3:
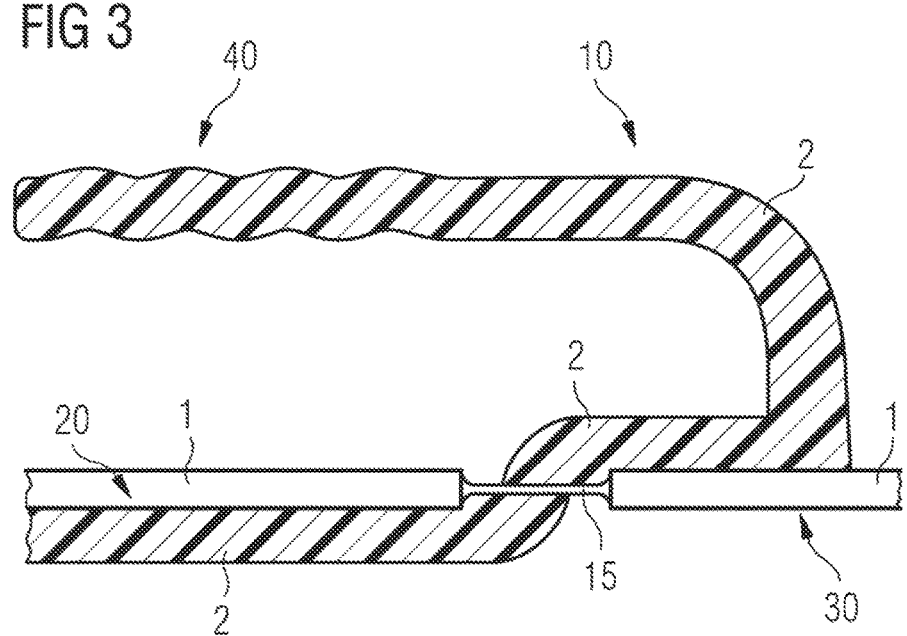
FIG. 3 is a cross sectional side view of an opening system.

In an example, illustrated in e.g. FIGS. 1 and 3, the first point 20 and the second point 30 lies on a straight line which creates the opening force along the same line. In an example the straight line coincides with a weakest point(s) of a material, e.g. a material comprising strands of fibers and the straight line is parallel to the fibers. In other examples the first 20 and second point 30 are arranged at e.g. 45, 90, 135 or 180 degree difference. This allows the opening system 10 to create forces in other directions. In other examples, the other directions are not coinciding with the weakest point(s) of a material but are angled in relation to the weakest point. In an example the angle is chosen such that a desired opening force is achieved based on the combination of the angle and a structure of the selected packaging material 1. By having this angle in relation to the structure of the packaging material 1 it is possible to use a single opening system 10 on different materials and achieve a same opening force by simply angling the opening system 10.

In an example the injection molding is performed by hydrostatic pressure injection molding. In an example the material used for injection molding is a thermoplastic and/or a thermosetting polymer. In an example the material used is a plastic.

In an example, the packaging material 1 of is made paper, cardboard and/or plastic. By having the packaging material 1 being made of a paperboard or cardboard the opening system can be used in a recyclable package. In other examples, other types of materials are used since the packaging material 1 used only need to be mechanically weaker than that of the opening system 10 so that the opening element 2 is capable of tearing, shearing, breaking or otherwise open the packaging material 1. Thus, there need to be a delta in mechanical strength between packing material 1 and the material used for the opening system 10. In an example the packaging material 1 is laminated 15. In an example the packaging material 1 is pre-laminated 15, i.e. laminated 15 before the opening system 10 is applied.

In an example, the packaging material 1 comprises a pre-made opening there through. By having a pre-made opening in the packaging material 1 the injection molding process of the opening system 10 is simpler and have less potential issues since the risk of e.g. any packaging material 1 being mixed into the opening element 2 when it penetrates the packaging material 1 from the inside to the outside is removed. This mixture could weaken the opening element 2 so that is becomes weaker than the packaging material 1. Thus, the opening element 2 can potentially break before the packaging material 1 is opened. If the packaging material 1 is laminated 15 and comprises the pre-made opening there through, the laminate 15 will retain its structure and function and also acts as a seal together with the opening element 2 for any product inside the container. If no laminate is present the pre-made opening will be filled by the opening element 2.

Figure 2:
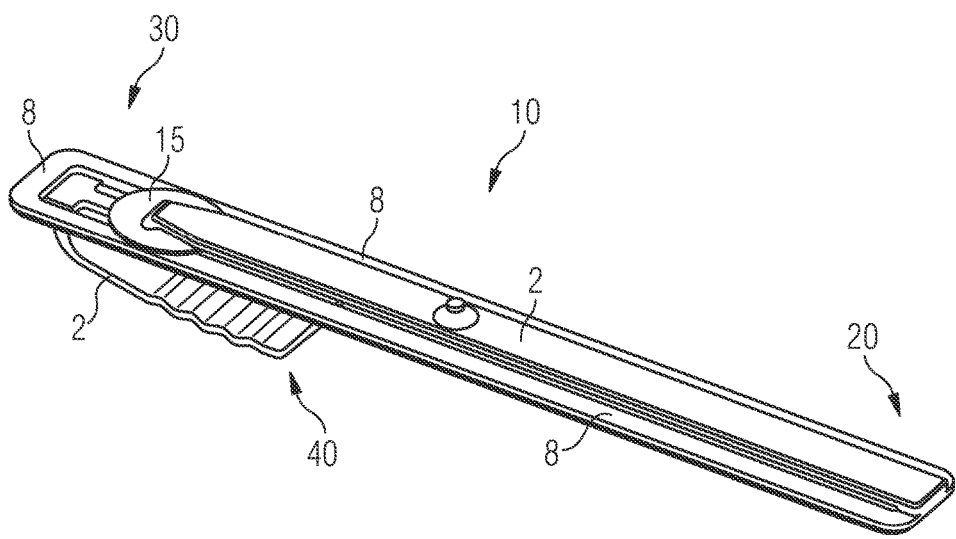
FIG. 2 is a bottom view of an opening system for a container comprising a support without packaging material.

In an example, illustrated in e.g. FIG. 1, the injection molded opening element 2 is attached parallel to the outside of the packaging material 1 from the second point 30 to where the opening element goes through to the inside of the packaging material 1. By having the opening element 2 being attached and running parallel to the packaging material 1 it will be even more affixed to the packaging material 1 and even better withstand any forces. In an example, the opening element 2 is attached parallel to the inside of the packaging material 1, illustrated in e.g. FIG. 2. In an example, the opening element 2 runs parallel with and is attached to both the inside and the outside of the packaging material 1.

In an example, the injection molded opening element 2 comprises a protrusion facing the inside of the packaging material 1 for penetrating through the packaging material 1 with. By having the opening element 2 comprising the protrusion it will more easily penetrate through the packaging material 1 with a cleaner cut or tear since the force from the opening element 2 will be initially localized to the protrusion and thus locally at the packaging material 1. In an example, the protrusion is a sharp edge of the opening element 2 and which extends all around the opening element 2 facing the packaging material 1 so that the opening element 2 initially penetrates all along its circumference when opening.

In an example, illustrated in e.g. FIG. 1, the opening system 10 further comprises an opening support 8 which at least partly encompasses the opening element 2. By having the opening support 8 at least partly encompassing the opening element at the outside of the packaging material 1, the opening support 8 acts as a counter force to the opening element 2 when being used to open the container, making it even easier to open the opening system 10. The opening support 8 also aids in any tearing of the packaging material 1 so that a cleaner visual appearance of the opening is created. In an example, the opening support 8 is arranged to encompass the opening element. In an example the opening element 2 is breakably attached by a connection to the opening support 8. By having the support structure 8 being attached to the opening element 2 the connection between them further strengthens the opening system 10 and its robustness. In an example the breakable connection is also a tamper evidence. In an example, two or more connections connect the opening element 2 to the opening support 8.

Figure 4:
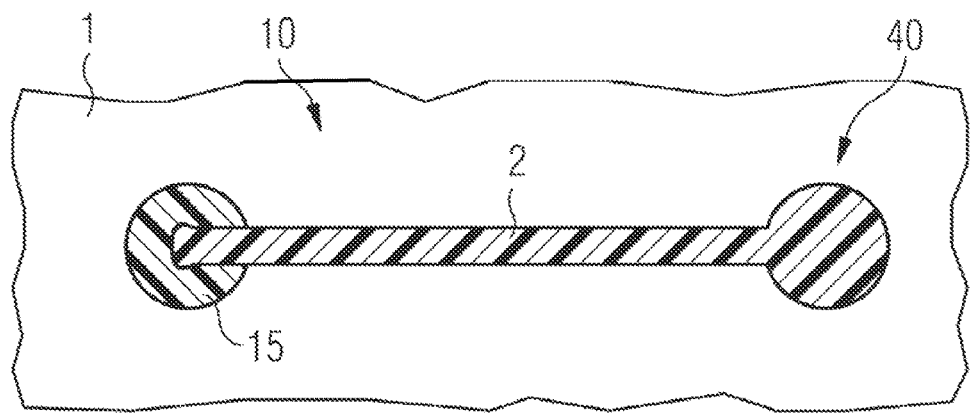
FIG. 4 is a top view of an opening system for a container with improved safety aspects.
Figure 5:
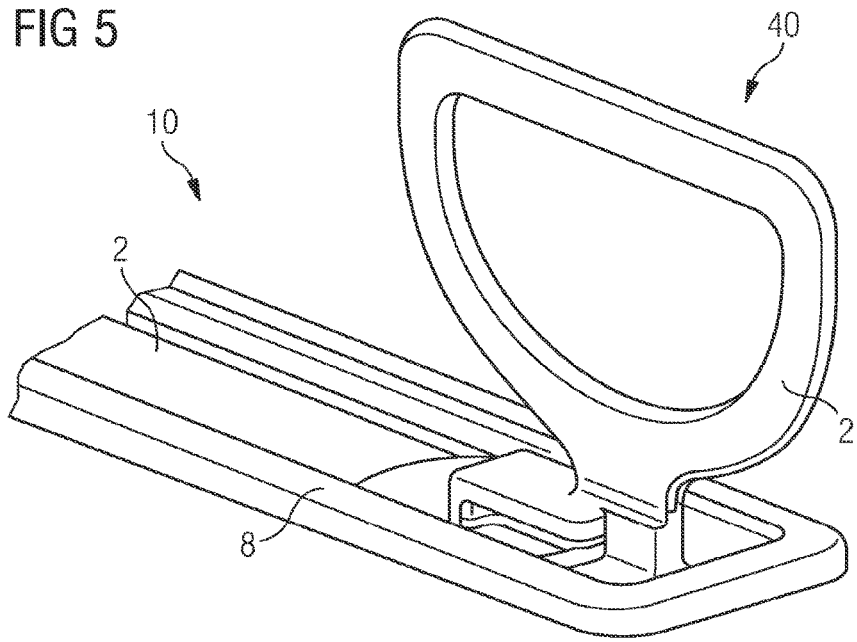
FIG. 5 is a side view of an opening system for a container with a ring shaped end of the opening system.

In an example, illustrated in FIG. 4, an end 40 of the extension of the opening element 2 from the second point 30 is attached to the outside of the packaging material 1. By having the end 40 of the extension attached to the packaging material 1 the opening system 10 comprises a tamper evidence. Additionally, the opening element 2 is secured form being accidentally or otherwise opened by something getting stuck at the end 40. In an example the end 40 is ball shaped, as illustrated in FIG. 4. Other examples of the end 40 such as having a waved surface, being ring shaped, are illustrated in e.g. FIGS. 1, 3 and 5. By having e.g. a waved surface at the end 40, the end 40 is easier to grip and maintain a grip for opening the opening system 10.

Figure 6:
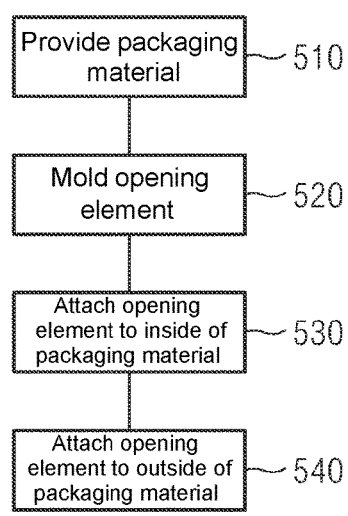
FIG. 6 is a flowchart of a method of producing an opening system.

In an example, illustrated in FIG. 6, a method of producing an opening system 10 for a container comprising providing 510 a packaging material 1 having an inside and an outside is disclosed. The method further comprises molding 520 an injection molded opening element 2 being arranged on the inside of the packaging material 1 and on the outside, and extending through packaging material 1. And, attaching 530 the molded opening element 2 to the inside at a first point 20, and attaching 540 the molded opening element 2 to the outside at a second point 30.

In an example, the method further comprises pre-making an opening through the packaging material 1. In an example the packaging material 1 is laminated following the pre-made opening is made.

In an example, the injection molded opening element 2 is attached parallel to the outside of the packaging material 1 from the second point 30 to wherein the opening element 2 goes through the packaging material 1.

In an example, the method further comprises molding an opening support 8 arranged at the outside of the packaging material 1 and at least partly encompassing the opening element 2.

In an example, the method further comprises molding an opening support 8 arranged at the outside of the packaging material 1 and encompassing the opening element 2.

Although the above description has been made with reference to a food package, it should be readily understood that the general principle of is applicable to other packages as well. Additionally, the above has been discussed in relation to a packaging material, a pre-laminated packaging material and it is apparent for a skilled person that the above principles would also be valid for packaging material having other types of treatments for e.g. secure an oxygen barrier, prevents light or other common material treatments.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. An opening system for a container, comprising:
   a packaging material having an outside surface corresponding to an outside of the container and an inside surface corresponding to an inside of the container; and
   an injection molded opening element, wherein the injection molded opening element includes:
     a first connection point directly attached to the inside surface of the packaging material;
     a second connection point directly attached to the outside surface of the packaging material, wherein the injection molded opening element extends from the first connection point, through an opening in the packaging material, and to the second connection point; and
     an extension element that extends outside of the container from the second connection point, wherein the extension element is configured to remove a seal of the opening in the packaging material.

2. An opening system according to claim 1, wherein the packaging material is made from at least one of paper, cardboard, or plastic.

3. An opening system according to claim 1, wherein the injection molded opening element is attached to extend parallel to the outside surface of the packaging material from the second connection point to the opening where the injection molded opening element goes through to the inside of the container.

4. An opening system according to claim 1, wherein the injection molded opening element comprises a protrusion facing the inside of the packaging material for penetrating through the packaging material.

5. An opening system according to claim 1, further comprising an opening support on the outside surface of the packaging material which at least partly encompasses the opening element.

6. An opening system according to claim 5, wherein the opening support is arranged to encompass the opening element.

7. An opening system according to claim 1, wherein an end of the extension element is attached to the outside surface of the packaging material.

8. An opening system according to claim 1, wherein the packaging material has a laminated material.

9. A container comprising an opening system according to claim 1.

10. An opening system according to claim 1, wherein the extension element extends in a direction, at least in part, towards the first connection point.

11. An opening system according to claim 1, wherein the first connection point is spaced apart from the second connection point relative to a longitudinal axis of the extension element.

12. An opening system according to claim 1, wherein the first connection point is positioned on an opposite side of the opening in the packaging material from the second connection point.

13. An opening system according to claim 1, wherein the extension element has an end portion that extends in the direction towards the first connection point for a distance outside of the container and spaced apart from the outside surface of the packaging material.

14. An opening system according to claim 5, wherein the opening support extends longitudinally between a first end thereof and a second end thereof, the first end of the opening support situated in proximity to the second connection point of the injection molded opening element and the second end of the opening support situated in proximity to the first connection point of the injection molded opening element.

15. A container having an opening system, comprising:
a packaging material forming a container, the packaging material having:
an outside surface corresponding to an outside of the container,
an inside surface corresponding to an inside of the container, and
a container opening extending from the inside surface of the packaging material to the outside surface of the packaging material; and
an injection molded opening element including:
a first connection point directly attached to the inside surface of the packaging material,
a second connection point directly attached to the outside surface of the packaging material, wherein the injection molded opening element extends from the first connection point, through the container opening, and to the second connection point,
a closure configured to seal the container opening, and
an extension element that extends outside of the container from the second connection point, wherein the extension element is configured for removing the closure from the container opening,
wherein the first connection point is spaced apart from the second connection point relative to a longitudinal axis of the extension element.

16. A container according to claim 15, wherein the extension element extends in a direction, at least in part, towards the first connection point.

17. A container according to claim 15, wherein the first connection point is positioned on an opposite side of the container opening from the second connection point.

18. A container according to claim 15, further comprising an opening support on the outside surface of the packaging material which at least partly encompasses the opening element, wherein the opening support extends longitudinally between a first end thereof and a second end thereof, the first end of the opening support situated in proximity to the second connection point of the injection molded opening element and the second end of the opening support situated in proximity to the first connection point of the injection molded opening element.

19. A container according to claim 15, wherein the extension element has an end portion that extends in the direction towards the first connection point for a distance outside of the container and spaced apart from the outside surface of the packaging material.

* * * * *